UNITED STATES PATENT OFFICE.

BONIFACE HEHLE, OF KANSAS CITY, MISSOURI.

BREWING PROCESS.

1,154,989. Specification of Letters Patent. Patented Sept. 28, 1915.

No Drawing. Application filed June 19, 1914. Serial No. 846,187.

*To all whom it may concern:*

Be it known that I, BONIFACE HEHLE, a citizen of the United States, residing at Kansas City, in the county of Jackson and State of Missouri, have invented certain new and useful Improvements in Brewing Processes, of which the following is a specification.

My invention relates to a brewing process, and my object is to obtain better quality and a greater yield of beer from a given amount of malt and raw cereals than is possible through the process now in use.

The principal steps in my process reside, first, in the manner in which the malt or raw cereal is ground; second, in the formation of a uniform filter-bed in the mash-tun; and third, subjecting the wort to a comparatively low temperature.

In the usual method of grinding malt and raw cereals, a comparatively large proportion of the same is reduced to flour, which results in the formation of overdough and underdough during the mashing process. This dough clogs the filter-bed and not only retards the running off of the wort, but prevents the sparging liquor from percolating uniformly through the grains, thereby reducing the capacity of the mash-tun and seriously interfering with an efficient extraction from the grains of the various desirable ingredients, collectively termed extractive substances, during mashing and sparging. Sparging water of a comparatively high temperature—usually from 167–171.5 degrees F. (60–62 degrees R.)—is also generally used and often leads to starchy turbidity and bitter taste of the wort.

The usual method of grinding malt and raw cereals also fails to properly open a large percentage of the husks of the grain, especially the so called "steely ends" thereof, so that a part of the best mealy substance remains in said husks, which latter, being practically nonsoluble, defeat enzymatic action on the meal remaining therein and thus cause a loss of from 3% to 5% of the extract during the sparging process.

In carrying out my process, I first grind the grain in such manner that its husks are split longitudinally from end to end, so that the meal contents are free to fall out or be otherwise exposed to enzymatic action and water during the mashing and sparging process. Hence all of the desirable elements of the meal are extracted during the production of the wort.

In grinding the grain care is exercised not to reduce the meal to the condition of flour, to avoid as far as possible the formation of dough in the mash-tun. After the husks of the grains have been split lengthwise in the process of grinding, as above described, they are placed in the mash-tun, where they constitute a uniform filter-bed through which the sparging liquid uniformly percolates and extracts all of the desirable elements from the meal.

Instead of using sparging water of from 167–171.5 degrees F. (60 or 62 degrees R.), as is customary, I reduce the temperature thereof to between 156–162.5 degrees F. (55 and 58 degrees R.), thus not only saving the expense of fuel necessary for the higher temperature, but also avoiding the danger of rendering the wort turbid and bitter from employing sparging water of a higher temperature.

I have discovered by actual practice on a commercial basis that my process effects a saving of from 3% to 5% in the use of grain, and not only increases the efficiency of the extracting process, but also materially increases the output of a mash-tun, owing to the uniform filter-bed formed therein by the longitudinally split grains.

Having thus described my invention, what I claim and desire to secure by Letters Patent, is:

1. The process of splitting grains longitudinally, and subjecting the same to heated sparging liquid.

2. The process of opening the husks of grain longitudinally to expose the mealy contents, forming a uniform filter-bed with said grains, and subjecting the same to a sparging liquid ranging from 156–162.5 degrees F. (55 to 58 degrees R.).

In testimony whereof I affix my signature, in the presence of two witnesses.

BONIFACE HEHLE.

Witnesses:
F. G. FISCHER,
FRED C. FISCHER.